United States Patent [19]

Blomstrand et al.

[11] Patent Number: 4,588,550

[45] Date of Patent: May 13, 1986

[54] FUEL ASSEMBLY FOR A BOILING WATER REACTOR

[75] Inventors: Jan Blomstrand; Anders Johansson; Sigvard Junkrans; Olov Nylund; Aart van Santen, all of Västerås, Sweden

[73] Assignee: Aktiebolaget ASEA-ATOM, Västerås, Sweden

[21] Appl. No.: 503,123

[22] Filed: Jun. 10, 1983

[30] Foreign Application Priority Data

Jul. 12, 1982 [SE] Sweden .............................. 8204269

[51] Int. Cl.⁴ .............................................. G21C 3/32
[52] U.S. Cl. ................................... 376/438; 376/434; 376/900
[58] Field of Search ............... 376/434, 441, 442, 900, 376/908, 438

[56] References Cited

U.S. PATENT DOCUMENTS

| 2,982,713 | 5/1961 | Sankovich et al. | 376/434 X |
| 3,205,144 | 9/1965 | Jabsen | 376/434 X |
| 3,808,098 | 4/1974 | Fredin | |

FOREIGN PATENT DOCUMENTS

| 0036142 | 9/1981 | European Pat. Off. | 376/444 X |
| 0050837 | 5/1982 | European Pat. Off. | 376/444 X |
| 1115153 | 5/1968 | United Kingdom | 376/434 |
| 1482788 | 8/1977 | United Kingdom | 376/434 |

OTHER PUBLICATIONS

Abstract of U.S. Pat. No. 4,314,884, Feb. 1982.
Abstract of "A Study Using the Model-2C Code of the Effects of Pellet and Cladding Asymmetries on PWR Fuel Rod Deformation Under Conditions Relevant to the NRU MT-3 Ballooning Experiment", Haste, May 1983.
INIS Atomindex, "Inspection of Irradiated Fuel Assemblies Using the Ultrasonic Technique", Bohmann, Nov. 1984.
"Practical Experience in the Application of Quality Control in Water-Reactor Fuel Fabrication", Dressler et al., Mar. 1984, p. 407.

Primary Examiner—Deborah L. Kyle
Assistant Examiner—Dan Wasil
Attorney, Agent, or Firm—Pollock, Vande Sande & Priddy

[57] ABSTRACT

Nuclear fuel assembly having four bundles of fuel rods, at least one fuel bundle being made with twenty symmetrically arranged fuel rod positions, the number of fuel rod positions in each of the remaining fuel rod bundles being at least sixteen and at most twenty-five.

7 Claims, 13 Drawing Figures

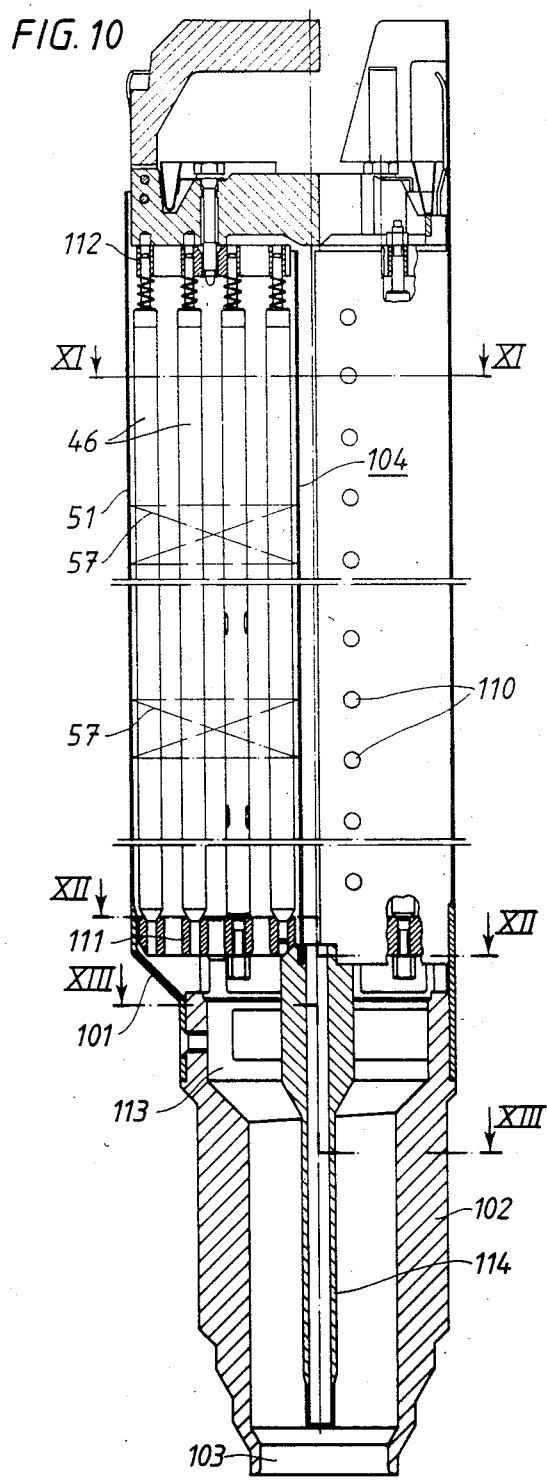
FIG. 10
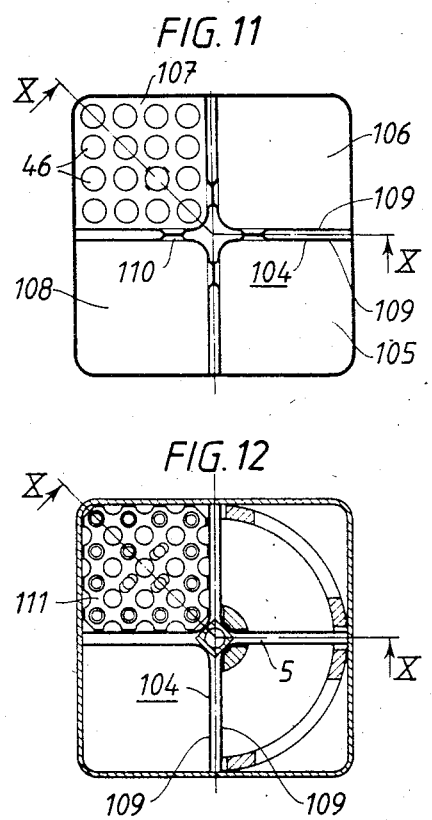
FIG. 11
FIG. 12
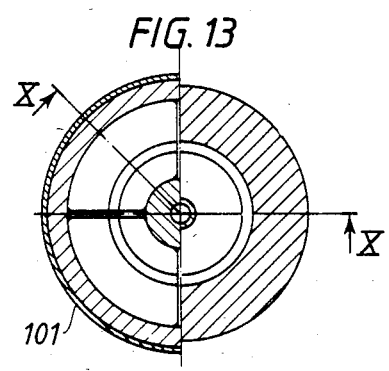
FIG. 13

FUEL ASSEMBLY FOR A BOILING WATER REACTOR

TECHNICAL FIELD

The present invention relates to a nuclear fuel assembly comprising a plurality of vertical fuel rods and a fuel channel made with four side walls and with substantially square cross-section. The fuel channel surrounds the fuel rods, and the fuel rods are divided, by means of a vertical water passage device of substantially cruciform cross-section, into four bundles of fuel rods. Each bundle has a substantially rectangular cross-section and comprises a plurality of spacers, arranged at different levels to position the fuel rods.

DISCUSSION OF PRIOR ART

Fuel assemblies of the kind described above are known, for example, from each of the published European patent applications Nos. 0036142 and 0050837.

The above-mentioned known fuel assemblies are made with sixty-four fuel rods per fuel assembly, and these fuel rods are divided into four bundles. Each bundle has 4×4 fuel rod positions corresponding to sixteen nodal points in a square lattice. Sixteen fuel rods are positioned in these fuel positions by means of a plurality of spacers arranged vertically one after the other. Each spacer comprises a total 4×4 spacer cells, each of which surrounds a corresponding fuel rod.

In a fuel rod, the contact between the fuel pellets and the cladding implies that the latter is subjected to great stress during reactor operation. Calculations have shown that the safety against corresponding damage to the fuel rod can be increased considerably by reducing the linear rod load, i.e. the power per unit of length. Advantages could be obtained if, with the above-mentioned known fuel assemblies, the number of fuel rods could be increased to some extent, while retaining the external dimensions of the fuel assembly and reducing the fuel rod diameter in such a manner that the total content of fuel material is substantially the same as in the known fuel assembly.

The smallest increase in the number of rods that can be carried out while maintaining the principle of construction used with the above-mentioned known fuel assemblies would imply bundles of 5×5 rods, whereby the total number of fuel rods in the assembly would become 100 instead of 64. This would require a fuel channel having considerably greater cross-section than that of the known fuel assemblies and/or a fuel rod thickness substantially smaller than that used in the known fuel assemblies. However, the cross-section of the fuel channel and the thickness of the fuel rods are chosen with optimum values in the known fuel assemblies, and using 100 fuel rods instead of 64 would give too great deviations from the optimum values and result in a rather disadvantageous fuel assembly.

DISCLOSURE OF THE INVENTION

The task which is sought to be solved by the present invention is to design a four-part fuel assembly of a type similar to that described in the introduction in such a way that the total number of fuel rod positions in the fuel assembly will be about eighty. This involves a breach of the advantageous and generally accepted design principle, according to which the fuel rod positions in a bundle are nodes in a single square lattice, or a breach of the similarly advantageous principle according to which the four fuel rod bundles of the assembly are designed with square, mutually equal cross-sections. (The "cross-section of a fuel rod bundle" is defined as the area defined by an imaginary flexible cord wound around the bundle.)

However, calculations carried out during the development work have shown that the safety against damage, obtained by using about eighty fuel rods in the fuel assembly, is so great that a breach of one or the other of the design principles mentioned above is fully justified.

In a fuel assembly according to the invention, at least one of the four fuel rod bundles are made with twenty fuel rod positions, whereas the number of fuel rods in each of the remaining bundles is at least sixteen and at most twenty-five, said twenty fuel rod positions being mirror-symmetrically arranged in relation to a vertical symmetry plane.

According to a first group of embodiments of the invention, ten of said twenty fuel rod positions coincide with nodes in a first square lattice, whereas the remaining ten fuel rod positions coincide with nodes in a second square lattice.

According to a second group of embodiments of the invention, said twenty fuel rod positions coincide with nodes belonging to a lattice composed of regular triangles only.

According to a third group of embodiments, said twenty fuel rod positions coincide with nodes belonging to a corresponding lattice composed of rectangles only.

In the preferred embodiments of the invention, at least two of the four fuel rod bundles of the fuel assembly are made with twenty fuel rod positions.

BRIEF DESCRIPTION OF THE DRAWINGS

In the following the invention will be described with reference to the accompanying schematic drawings, wherein:

The fuel assembly shown in FIG. 8 is also shown in FIGS. 10, 11, 12, 13, whereby FIG. 10 is a vertical section along X—X of FIGS. 11, 12, 13, whereas FIGS. 11, 12, 13 show horizontal sections along XI—XI, XII—XII, and XIII—XIII, respectively, of FIG. 10.

The fuel assemblies shown deviate from those shown in European patent application No. 0050837 substantially only as regards the number and thickness of the fuel rods and in the manner in which they are placed in relation to each other within each bundle. In fuel assemblies constructed according to the invention, the external dimensions may be exactly the same as the corresponding dimensions in the above-mentioned known fuel assemblies. Fuel assemblies constructed according to the invention—similarly to the above-mentioned known fuel assemblies—are intended to be arranged in the core of a boiling water reactor in such a manner that water-filled spaces are defined between adjacent fuel channels. Since the moderator effect of these water-filled spaces have a substantial influence on the nuclear reaction, it is important that the distance between them, i.e. the cross-section of the fuel channel, is not too great.

DESCRIPTION OF PREFERRED EMBODIMENTS

Figure 1:
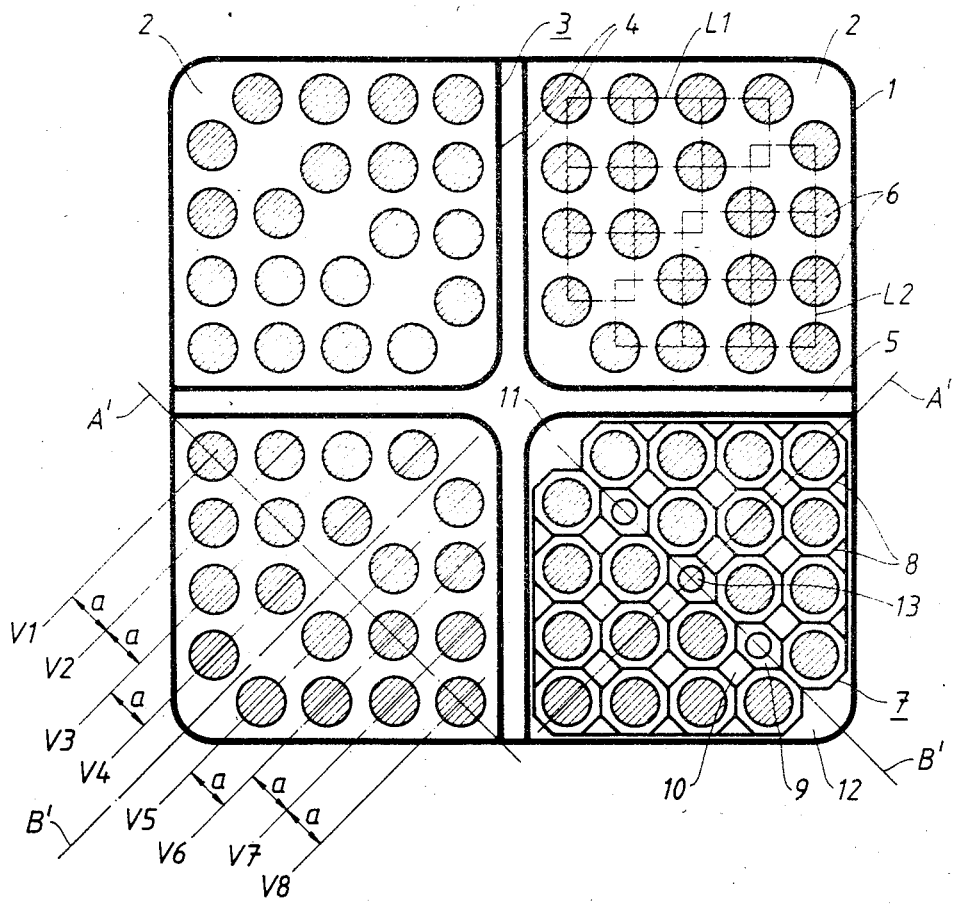
FIG. 1, FIG. 2, FIG. 4, FIG. 6, FIG. 8, FIG. 9 show respectively a first, a second, a third, a fourth, a fifth and a sixth embodiment of a fuel assembly according to the invention in a horizontal section through the active portion of the fuel assembly.

The fuel assembly shown in FIG. 1 has a vertical fuel channel 1, which is divided into four partial channels with the aid of an elongated, vertically directed water passage device 3 of cruciform cross-section. The water passage device 3 is composed of four elongated sheet-metal elements, 4, of L-shaped cross-section and defines a vertical water passageway, 5, of cruciform cross-section. The sheet-metal elements 4 are welded to the inside of the fuel channel 1. Each partial channel surrounds a corresponding bundle 2 of twenty fuel rods 6, which are positioned by means of a plurality of spacers 7 arranged in the vertical direction one after the other in the partial channel. The spacer 7 comprises twenty spacer cells, 8, which are welded to each other. Each spacer cell comprises two sheet-metal rings made in the form of regular octagons, each sheet-metal ring lying in a corresponding horizontal plane. These two rings are in each spacer cell connected to each other by means of a plurality of vertically running, resilient sheet strips (not shown), each sheet strip having a mid-portion which is adapted to make mechanical contact with a fuel rod surrounded by the spacer cell. Each spacer cell may, for example, be designed as the spacer cell described in U.S. Pat. No. 4,190,494—with the only difference that octagonal rings are used instead of pentagonal ones. The spacer 7 has three hexagonal openings 9, which are partly defined by means of external surfaces belonging to some of the above-mentioned octagonal rings, partly by means of a plurality of rectangular stiffening frames 10, each of which being welded to three immediately adjacently positioned spacer cells 8. The height of the stiffening frames 10 is approximately equal to the height of the spacer cells 8.

In each bundle there are ten fuel rod positions which constitute nodes in a first square lattice, L1, and ten fuel rod positions which constitute nodes in a second square lattice, L2. The squares of the lattice L1 are mutually congruent and congruent with those of the lattice L2 and oriented in the same manner, i.e. with each side parallel to a corresponding side of the fuel channel 1. Each of the two lattices can be imagined as a lattice attained by moving—in a diagonal direction—a lattice coinciding with the other.

Alternatively, a water tube 13 may be arranged in each opening 9. Said water tube may be mechanically connected to a plurality of spacers 7 in such a way that these are prevented from moving to any substantial extent in the vertical direction. At two of the corners of the sub-bundles there are spacers 11 and 12, respectively, in which, alternatively, means for spacer holder function, or tying means constituting a mechanical connection between upper tie plates and lower tie plates, can be arranged.

The vertical centre lines through the spacer cells constitute fuel rod positions. In each bundle, the fuel rod positions are mirror-symmetrically arranged with respect to two diagonally oriented vertical symmetry planes A' and B', which intersect each other at an angle of 90°. The symmetry plane A' passes through four fuel rod positions. On each side of the symmetry plane B', ten of the twenty fuel rod positions of the bundle are divided amongst four imaginary vertical planes V1, V2, V3, V4 and V5, V6, V7, V8, respectively, arranged in parallel with the symmetry plane B' and with a constant mutual distance, a, the number of fuel rod positions per plane varying between one and four.

The two octagonal rings in each spacer cell 8 has the same orientation, each cell side comprising two ring sides. Eight spacer cells are arranged with one cell side each in the symmetry plane B.

Figure 2:
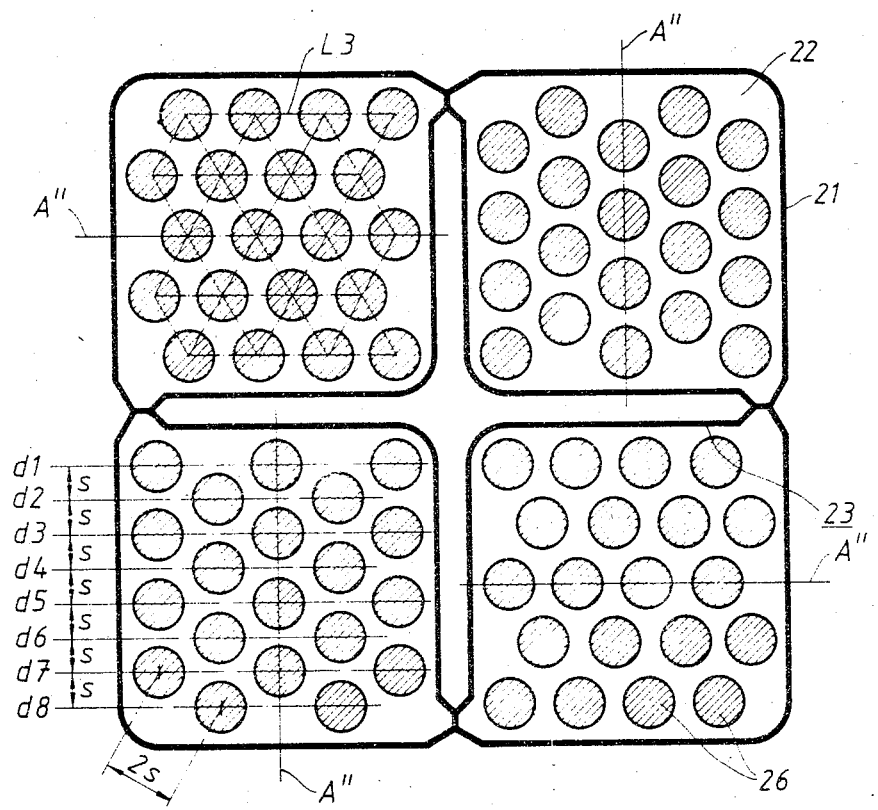
Figure 3:
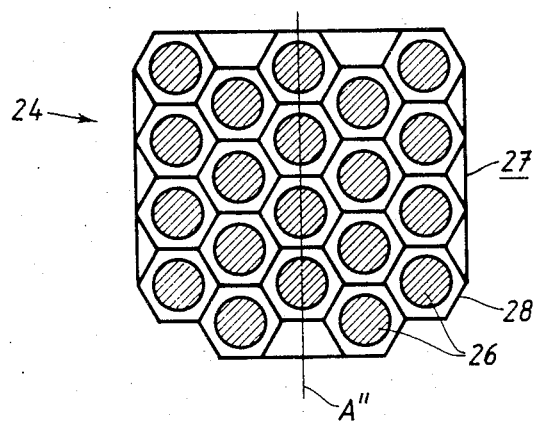
FIG. 3 shows a vertical view of a spacer arranged in one of the fuel rod bundles shown in FIG. 2.

The fuel assembly shown in FIGS. 2 and 3 has a vertical fuel channel 21 made with substantially square cross-section, said fuel channel being divided into four partial channels, 22, by means of an elongated, vertically directed water passage device 23 of cruciform cross-section, said water passage device 23 being welded to the fuel channel 21.

Each partial fuel channel 22 surrounds a bundle 24 which contains twenty fuel rods 26, which are positioned by means of a plurality of spacers 27 arranged vertically one after the other in the partial channel. The spacer 27 contains twenty spacer cells 28 which are arranged at one and the same level and welded to each other. Each spacer cell comprises two sheet-metal rings made in the form of equilateral hexagons and arranged in spaced relationship one above the other, each ring lying in a corresponding horizontal plane. The rings are connected to each other by means of a plurality of mainly vertically running resilient sheet strips (not shown in the drawing). Each spacer cell 28 may, for example, be made as the spacer cell described in U.S. Pat. No. 4,190,494, with the only difference that hexagonal rings are used instead of pentagonal ones.

The twenty fuel rod positions of the fuel rod bundle 24 are symmetrically distributed in relation to a vertical symmetry plane A", which passes through four fuel rod positions and which is perpendicular to a pair of mutually parallel walls of the fuel channel 21. The twenty fuel rod positions are distributed with alternately three and two positions per plane amongs eight imaginary vertical planes d1, d2, d3, d4, d5, d6, d7, d8, arranged with a constant mutual distance s, said vertical planes being perpendicularly oriented with respect to the symmetry plane A". In each bundle, the twenty fuel rod positions coincide with the nodal points in a lattice, L3, composed of regular triangles, where the length of each triangular side is two times the distance s.

Figure 4:
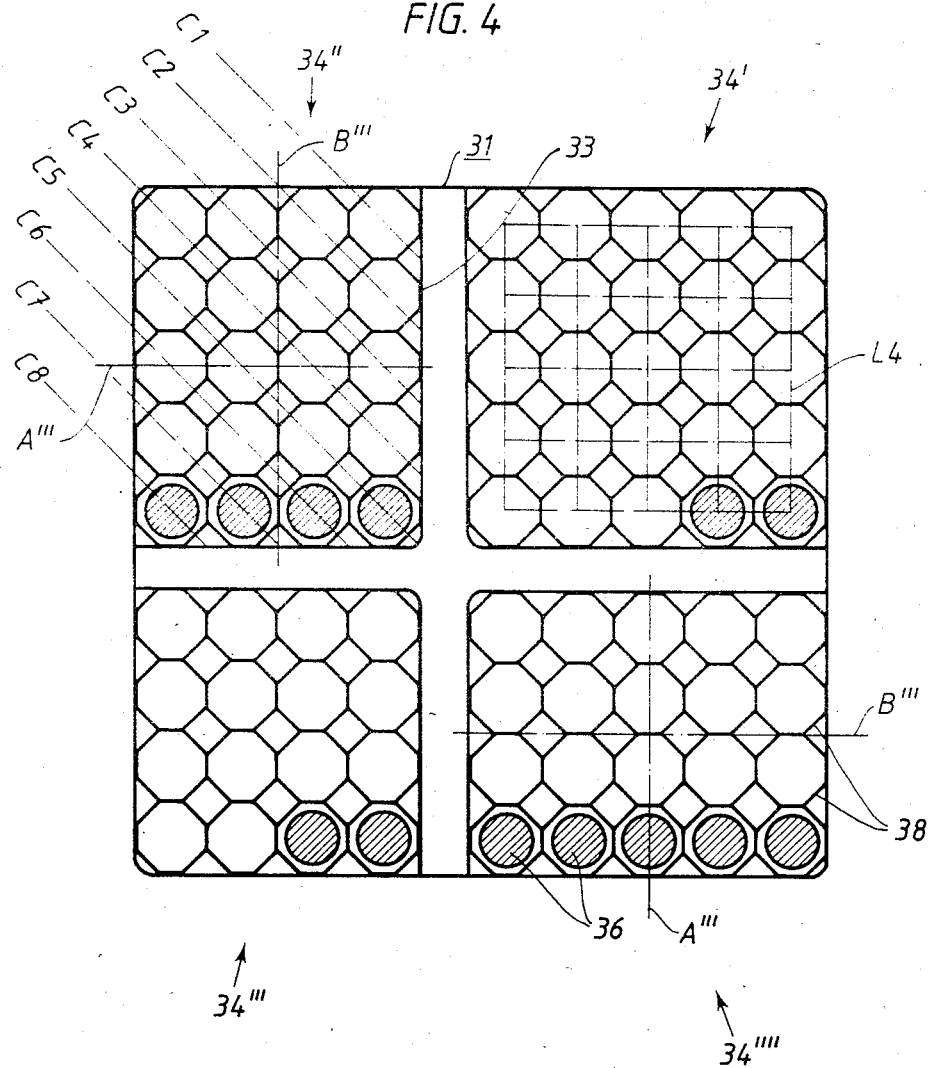

FIG. 4 shows a fuel assembly containing eighty-one vertical fuel rods, 36, of one and the same thickness, said fuel rods being surrounded by a fuel channel, 31, of substantially square cross-section, which, by means of a water passage device, 33, of cruciform cross-section, is divided into four partial channels, each partial channel surrounding a fuel rod bundle, 34' and 34", 34"', 34"", respectively. Each of the bundles 34" and 34"", which are mutually alike, is surrounded by a corresponding partial fuel channel of rectangular but not square cross-section and comprises twenty fuel rods each. The corresponding twenty fuel rod positions coincide with nodal points in a square lattice and are mirror-symmetrically arranged in relation to two vertical symmetry planes A"' and B"'. These intersect each other at an angle of 90° and are parallel to side walls of the fuel channel 31. Four fuel rod positions lie in the symmetry plane A"'. Said twenty fuel rod positions are unevenly distributed amongst eight imaginary, mutually parallel vertical planes, C1–C8, which are oriented to intersect the symmetry plane A"' at an acute angle. The bundles 34" and 34"" have spacers by means of which the fuel rods in each of these bundles are positioned in a corresponding square lattice. The spacer cells, 38, are of the same type as those shown in FIG. 1, and each spacer cell has eight cell sides, each lying in a vertical plane, said cell sides forming four pairs of mutually parallel cell sides. Ten spacer cells are positioned and one cell side each in the symmetry plane B'''. The bundles 34' and 34''' are arranged in partial channels made with substantially square cross-sections and contain twenty-five and sixteen fuel rods, respectively. The spacer cells of the bundles 34' and 34''' are constructed in exactly the same way as the spacer cells 38 of the bundles 34'' and 34'''' and, similarly to these, welded to each other. In each of the four bundles the fuel rod positions conicide with nodes in a square lattice of the same structure as the lattice L4 of the bundle 34'.

Figure 5:
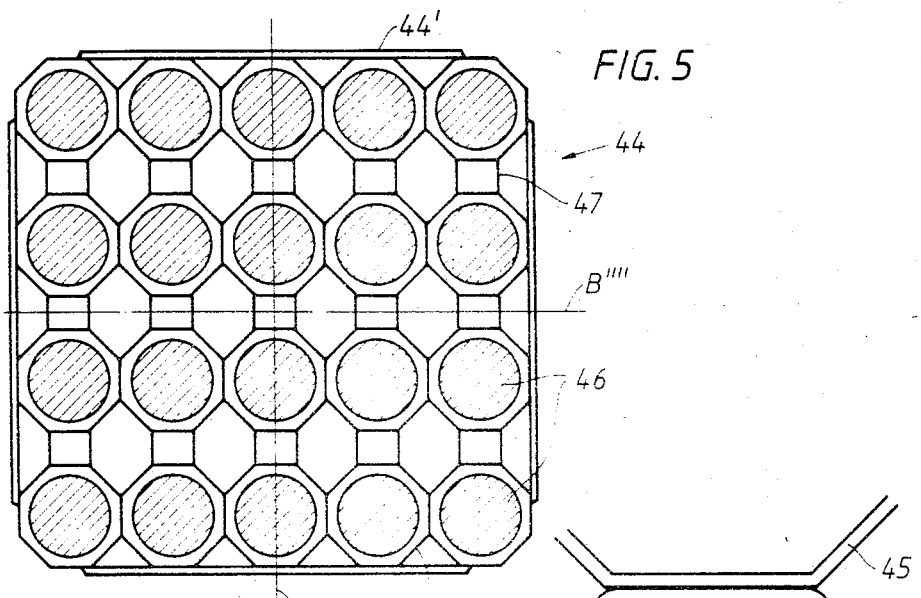
FIG. 5 shows a vertical view of a spacer arranged in one of the fuel rod bundles shown in FIG. 6.
Figure 6:
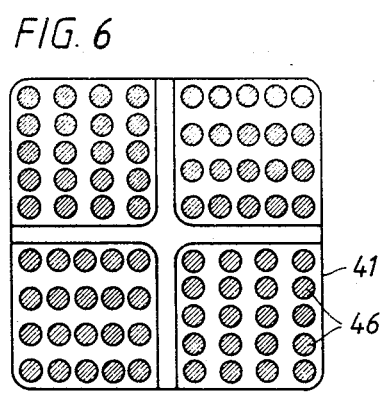
Figure 7:
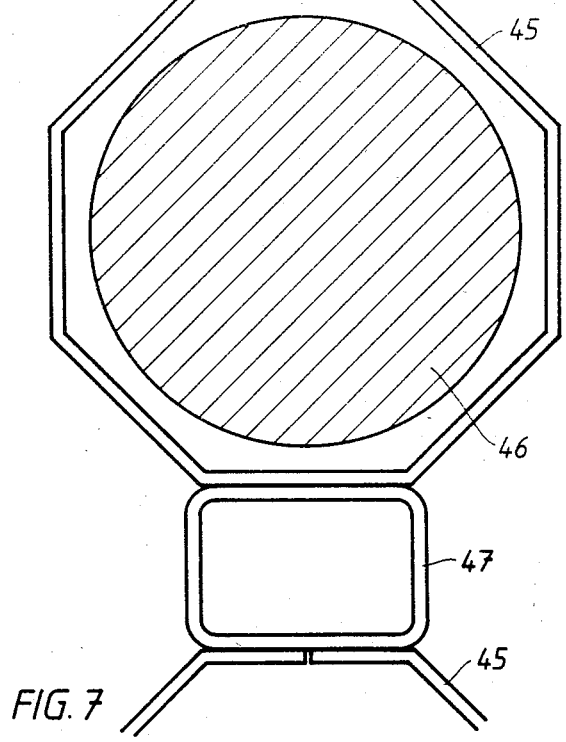
FIG. 7 shows on an enlarged scale a part of FIG. 5.

FIG. 6 shows a fuel assembly which has a fuel channel, 41, made with substantially square cross-section and which is divided, by means of a water passage device of cruciform cross-section, into four partial channels of substantially square cross-section. The four partial channels contain four mutually identical fuel rod bundles 44, made according to FIG. 5, each of said bundles containing four rows of five fuel rods 46. In each bundle the fuel rod positions are symmetrical with respect to two symmetry planes A'''' and B'''', which are parallel to corresponding pairs of side walls of the fuel channel 41. Each of the fuel rods 46 is surrounded by an octagonal spacer cell 48, which is constructed in the same way as the spacer cells shown in FIG. 1. In each of the rows of fuel rods, arranged parallel to the symmetry plane B'''', the spacer cells are welded direct to each other. In each of rows of fuel rods, arranged parallel to the symmetry plane A'''', on the other hand, the four spacer cells are connected to each other by means of three connecting elements welded to the cells. Each connecting element is formed as a rectangular frame, 47, of thin sheet metal. The spacer 44 is provided with eight thin, horizontal sheet strips 44', each of which being welded to four adjacent spacer cells. FIG. 7 shows two frames 47 welded to an upper, octagonal ring, 45, included in the spacer cell 48. The sheet material is substantially arranged in four different vertical planes in each of the frames 47. The elements 44', 47 and 45 are made with one and the same vertical dimension. Each spacer cell 48 also comprises a lower ring (not shown), which is congruent with the ring 45 and which is welded to two frames 47 (not shown) arranged at the lower portion of the cell. In FIG. 5 only half the number of the sheet strips 44' is shown, namely those arranged on a level with the rings 45.

Figure 8:
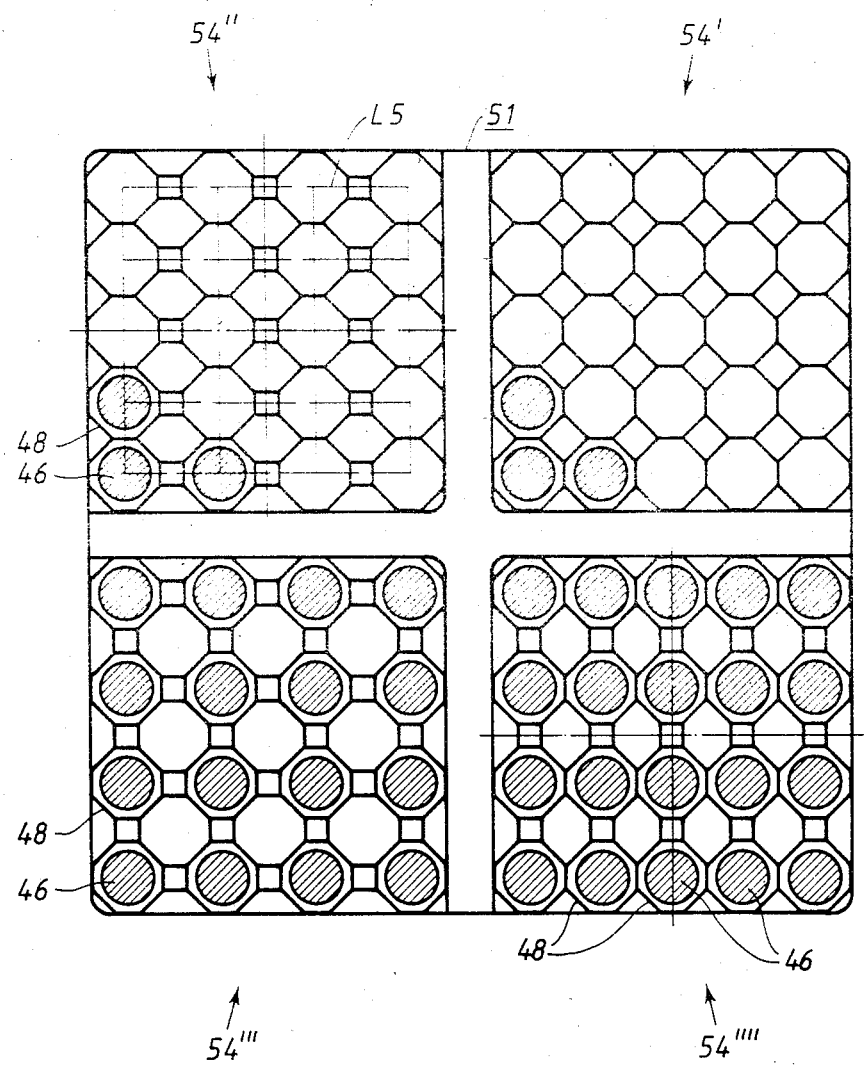

FIG. 8 shows, together with FIGS. 10, 11, 12, 13, a fuel assembly containing eighty-one vertical fuel rods, 46, of one and the same thickness, surrounded by a fuel channel 51 of substantially square cross-section and made in a zirconium alloy which, by means of a water passage device 104 of cruciform cross-section, is divided into four substantially square partial channels, 105, 106, 107, 108, each of said partial channels surrounding a fuel rod bundle 54' and 54'', 54''', 54'''', respectively. The bundles 54'' and 54'''' have exactly the same structure as the bundle 44 shown in FIG. 5. Each of these bundles have twenty fuel rod positions coninciding with nodes in a lattice L5 composed of congruent rectangles only. Each rectangle has two longer sides and two shorter sides. The bundle 54''' is made with sixteen and the bundle 54' with twenty-five fuel rod positions.

In the sub-bundle 54''' the spacer cells are made exactly the same as the cells 48, and they are connected to each other by means of welded frames which are made in the same way as the frames 47. The bundle 54' is made in the same way as the bundle 34' described above.

As shown in FIGS. 10, 12, 13, the fuel channel 51 is welded at its lower portion to a transition piece 101 made in a zirconium alloy. The wall thickness of the transition piece 101 is considerably greater than the wall thickness of the fuel channel 51. At the lower part, the transition piece 101 has a circular portion which is attached by means of screws to an inlet nozzle 102 made of stainless steel. The inlet nozzle has an inlet opening 103 for a water flow streaming through the fuel assembly. The water passage device 104 is composed of four mutually similar, elongated sheet-metal elements 109 of L-shaped cross-section. Each sheet element 109 has a plurality of stamped projections 110, which make contact with corresponding stamped projections 110 of adjacent sheet elements and are welded thereto. In addition, each sheet element 109 is attached to two walls of the fuel channel 51 by means of a plurality of welded joints evenly distributed along the entire length of the water passage device 104, whereby this constitutes a stiffening member counteracting deflection of the walls of the fuel channel 51.

Each of the four sub-bundles 54', 54'', 54''' and 54'''' is provided with a bottom tie plate and with a top tie plate. In the sub-bundle 54''' the bottom tie plate is designated 111 and the top tie plate 112. The bottom tie plates 111 are supported by a spider 113 welded to the inner side of the inlet nozzle 102. The spider also supports a water tube 114 hydraulically connected to the lower end of the water passage device 104. Each sub-bundle is provided with a plurality of spacers 57 arranged vertically one after the other.

Figure 9:
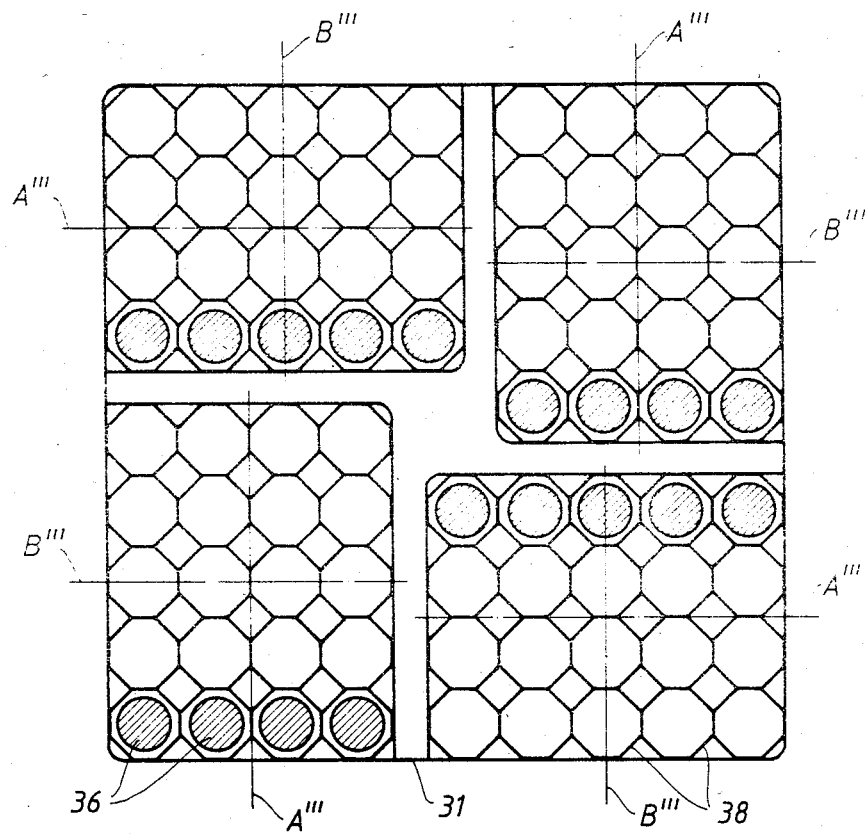

The fuel assembly shown in FIG. 9 differs from that shown in FIG. 4 only in that all the sub-bundles are constructed as the sub-bundles 34'' and 34'''' shown in FIG. 4.

The construction principle shown in FIGS. 10, 11, 12, 13 can be employed for all the embodiments of the invention described above, whereas the top tie plates, the bottom tie plates and the attachment and supporting members for these are in each case adapted to the structure and positions of the sub-bundles in relation to each other. In the fuel assembly shown in FIG. 4, for example, this adaptation means that the tube 114 will have an eccentric position in relation to the inlet nozzle 102.

A fuel assembly according to the invention can also be made without the water tube 114 shown in FIG. 10, but the water passage device of cruciform cross-section should—at its lower end—have at least one inlet opening for water.

The invention also comprises a plurality of embodiments not shown in the drawings, for example fuel assemblies which deviate from those shown in FIG. 1 and in FIG. 2, respectively, in that one, two or three of the shown bundles are replaced by a corresponding number of the shown bundles made with a different structure, for example by one or two of the sub-bundles 54' made with twenty-five fuel rod positions, and/or by one or two of the sub-bundles 54''' made with sixteen fuel rod positions. Further, the invention comprises a fuel assembly which differs from that shown in FIG. 8 in that the bundle 54''' with sixteen fuel rod positions has been replaced by a bundle which has twenty-five fuel rod positions, for example one which is made in the same way as the bundle 54'—or by a bundle having twenty fuel rod positions, for example the bundle 2 or the bundle 54".

As a further example of a fuel assembly according to the invention there may be mentioned a fuel assembly which differs from that shown in FIG. 8 in that the two sub-bundles 54" and 54"" have been replaced by two sub-bundles 54"' (made with sixteen fuel rod positions), whereas the sub-bundle 54"' has been replaced by one sub-bundle which is made with twenty fuel rod positions, and is formed in the same way as the shown sub-bundle 54".

Further, the invention comprises a fuel assembly which is different from the fuel assembly shown in FIG. 1 only in that at least one of the water tubes 13 has been replaced in one or several fuel rod bundles by at least one irregular fuel rod, for example a specially designed fuel rod, made with considerably smaller thickness than the fuel rods 6.

Not taking into account irregular fuel rod positions corresponding to the irregular fuel rods mentioned above, the total number of fuel rod positions in a fuel assembly according to the invention would be greater than 71 and smaller than 96, preferably greater than 76 and smaller than 91.

The invention comprises also a fuel assembly in which some of the fuel rod positions stated in the present claims are not occupied by fuel rods, for example a fuel assembly in which a few fuel rod positions are occupied by water tubes.

Further, in a fuel assembly according to the invention, a water passage device dividing the rods into four bundles can be of a structure differing from that disclosed above. For example, it can be constituted by a plurality of vertical water tubes, which are made with circular cross-sections and arranged in two rows, the rows intersecting each other at a right angle.

We claim:

1. In a boiling water reactor, a fuel assembly comprising a plurality of vertical fuel rods and a fuel channel made with four side walls and with substantially square cross-section, said fuel channel being arranged to surround said fuel rods, said fuel rods being divided, by means of a vertical water passage device of substantially cruciform cross-section, into four bundles of fuel rods, each bundle having a substantially rectangular cross-section and comprising a plurality of spacers arranged at different levels to position the fuel rods of the bundle at points of intersection with a transversal plane, wherein at least one of said bundles is made with only twenty fuel rod positions, each of said fuel rod positions being occupied by a fuel rod and the number of fuel rod positions in each of the remaining fuel rod bundles being at least sixteen and at most twenty-five, whereas said twenty fuel rod positions are mirror-symmetrically arranged in relation to a first vertical symmetry plane, four of said twenty fuel rod positions lying in said first symmetry plane, said twenty fuel rod positions being unevenly distributed among eight imaginary vertical planes which are oriented perpendicularly to said first symmetry plane, said twenty fuel rod positions being also mirror-symmetrically arranged in relation to a second vertical symmetry plane which is perpendicularly oriented with respect to said first symmetry plane, said first symmetry plane being substantially diagonally oriented with respect to said substantially rectangular cross-section of the bundle, whereas ten of said twenty fuel rod positions coincide with nodes in a first square lattice and the remaining ten fuel rod positions coincide with nodes in a second square lattice.

2. A fuel assembly as claimed in claim 1, wherein said at least one bundle comprises at least one spacer which is composed of a plurality of octagonal spacer cells, each spacer cell having eight cell sides, each cell side lying in a corresponding vertical plane, said cell sides constituting four pairs of mutually parallel cell sides, two of said cell side pairs being parallel to corresponding pairs of said walls in said fuel channel, eight of said spacer cells being positioned with a cell side in said second symmetry plane.

3. A fuel assembly as claimed in claim 2, wherein each of said spacers has three openings, the vertical centre lines of which lie in said second symmetry plane, at least one of said openings having a water tube inserted therein.

4. A fuel assembly as claimed in claim 1, wherein the number of said at least one bundle is at least two.

5. In a boiling water reactor, a fuel assembly comprising a plurality of vertical fuel rods and a fuel channel made with four side walls and with substantially square cross-section, said fuel channel being arranged to surround said fuel rods, said fuel rods being divided, by means of a vertical water passage device of substantially cruciform cross-section, into four bundles of fuel rods, each bundle having a substantially rectangular cross-section and comprising a plurality of spacers arranged at different levels to position the fuel rods of the bundle at points of intersection with a transversal plane, wherein at least one of said bundles is made with only twenty fuel rod positions, each of said fuel rod positions being occupied by a fuel rod and the number of fuel rod positions in each of the remaining fuel rod bundles being at least sixteen and at most twenty-five, whereas said twenty fuel rod positions are mirror-symmetrically arranged in relation to a vertical symmetry plane, four of said twenty fuel rod positions lying in said symmetry plane, said twenty fuel rod positions being unevenly distributed among eight imaginary vertical planes, which are oriented perpendicularly to said symmetry plane, said symmetry plane being parallel to two of the four side walls of said fuel channel, whereby four of said eight vertical planes have three fuel rod positions in each plane, and the remaining four planes have two fuel rod positions in each plane, wherein said twenty fuel rod positions coincide with nodes in a triangular lattice.

6. A fuel assembly as claimed in claim 5, wherein said at least one bundle contains a plurality of spacers arranged at different levels, each of said spacers containing a plurality of hexagonal spacer cells having three pairs of mutually parallel cell sides, the cell sides lying in vertical planes, each spacer cell having one cell side pair which is parallel to a side wall of said fuel channel.

7. A fuel assembly as claimed in claim 5, wherein the number of said at least one bundle is at least two.

* * * * *